(12) United States Patent
Sahashi

(10) Patent No.: US 9,522,620 B2
(45) Date of Patent: Dec. 20, 2016

(54) VEHICLE SEAT

(71) Applicant: TOYOTA BOSHOKU KABUSHIKI KAISHA, Aichi-ken (JP)

(72) Inventor: Hideo Sahashi, Komaki (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/694,344

(22) Filed: Apr. 23, 2015

(65) Prior Publication Data

US 2015/0307001 A1    Oct. 29, 2015

(30) Foreign Application Priority Data

Apr. 25, 2014   (JP) .............................. 2014-091069

(51) Int. Cl.
*B60N 2/58* (2006.01)
(52) U.S. Cl.
CPC ............. *B60N 2/585* (2013.01); *B60N 2/5825* (2013.01); *B60N 2002/5808* (2013.01)
(58) Field of Classification Search
CPC ............................ B60N 2/585; B60N 2/5825
USPC ................................ 297/218.2, 218.3, 452.6
See application file for complete search history.

(56) References Cited

U.S. PATENT DOCUMENTS

| | | | | |
|---|---|---|---|---|
| 8,191,971 B2* | 6/2012 | Lovasz | ................ | B60N 2/5825 297/452.6 X |
| 8,197,010 B2* | 6/2012 | Galbreath | ............ | B60N 2/5825 297/218.2 |
| 2002/0101109 A1* | 8/2002 | Stiller | .................. | B60N 2/5825 297/452.6 X |

FOREIGN PATENT DOCUMENTS

JP     2013-132328     7/2013

\* cited by examiner

*Primary Examiner* — Anthony D Barfield
(74) *Attorney, Agent, or Firm* — Greenblum & Bernstein, P.L.C.

(57) ABSTRACT

The present invention relates to a vehicle seat. A locking member is displaceable between a first state, in which a locking portion is used to hold part of a seat cover while a base portion is buried and fixed to a seat pad, and a second state, in which part of the seat cover is pulled more strongly toward the outside of the seat than in the first state, so that the base portion is bent gradually toward a direction away from the seat pad as toward a fragile part from an end of the first part and an end of the second part.

11 Claims, 4 Drawing Sheets

VEHICLE SEAT

INCORPORATION BY REFERENCE

The disclosure of Japanese Patent Application No. 2014-091069 filed on Apr. 25, 2014 including the specification, drawings and abstract is incorporated herein by reference in its entirety.

BACKGROUND OF THE INVENTION

1. Field of the Invention

The present invention relates to a vehicle seat including a seat pad, a seat cover and a locking member (a member capable of locking part of the seat cover tucked into a groove portion of the seat pad fixed in a groove portion of the seat pad.

2. Description of Related Art

As this type of vehicle seat, a vehicle seat with a seat pad, a seat cover and a clip (corresponding to a locking member) is known (see Japanese Patent Application Publication No. 2013-132328 (JP 2013-132328 A)). The seat pad is a member that forms an outer shape of the seat to support an occupant elastically, and has a flat seated portion which forms the center of the seat, a convex bank portion that forms side portions of the seat, and a linear groove portion (a recess extending vertically and horizontally on a seat surface) formed between the seated portion and the bank portion. Further, the seat cover is a bag-like member that covers seated side of the seat pad, and part of the seat cover is provided, via a tucked cloth, with a pull-in member (a flat workpiece with its front end being arrow-shaped). Further, the chip (the locking member) has a base portion (a substantially rectangular flat part), a first sheet portion and a second sheet portion. The first sheet portion and the second sheet portion are flat portions disposed upright spaced properly from the base portion, a part of the seat cover (the front end of the pull-in member) can be locked between the first sheet portion and second sheet portion.

In the related art, a plurality of locking members are fixed at a proper spacing along the groove portion of the seat pad. Then both sides of the base portion are buried and fixed in a wall body of the groove portion, and the first sheet portion and the second sheet portion are exposed toward the inside of the groove portion. Moreover, the seat cover is used to cover the seat pad, and the tucked cloth (the pull-in member) and part of the seat cover are together locked by the locking member while being pulled into the groove portion. Thereby part of the seat cover can be tucked in the groove portion of a seat pad and fixed along the groove portion of the seat pad.

SUMMARY OF THE INVENTION

However, in such a vehicle seat, for example, an airbag is provided in a bank portion which forms side portions of the vehicle seat, and expands outward due to partially crack of a seat cover, etc. in the case of, e.g., vehicle collision. Then the seat cover is pushed by the airbag expanding (pushed from the inside of the seat) and is tensioned. Moreover, in a structure of the related art, a cloth trucked in a groove portion of a seat pad is pulled (excessively pulled) toward the outside of the seat under tension of the seat cover, e.g., and a base portion of a clip sometimes falls off the seat pad (a structure lacking mounting stability). The present invention is set forth in consideration of the above circumstances, and it is an objective of the present invention to further improve mounting stability of a locking member.

A vehicle seat according to the first aspect of the invention has seat members which form a seat body, such as a seat cushion or a seatback. Moreover, the seat member has a seat pad that forms an outer shape of the seat to support an occupant elastically, a linear groove portion formed on a surface of the seat pad, a locking member fixed to the seat pad, and a seat cover that covers the seat pad. In the first aspect of the present invention, the locking member has a flat base portion buried and fixed in the groove portion and a locking portion upright disposed from the base portion to be exposed toward the inside of the groove portion, and part of the seat cover is tucked in the groove portion and locked by the locking portion.

Therefore, in the first aspect of the present invention, the base portion may have a flat first part, a flat second part connected with the first part in the extension direction of the groove portion, and a fragile part formed between the first part and the second part.

The locking member holds part of the seat cover (forming a first state) while the base portion is buried in the seat pad and fixed to the seat pad. Moreover, part of the seat cover is pulled more strongly toward the outside of the seat than in the first state, so that the locking member is displaceable to a second state in which the base portion is bent gradually toward a direction away from the seat pad as toward the fragile part from an end of the first part and an end of the second part. In the first aspect of the present invention, the locking member (the base portion) in the second state is bent at the fragile part to scatter a pull force of part of the seat cover, so that the first part and the second part can maintain as much as possible buried in the seat pad at the parts (end portion sides) away from the fragile part.

In a second aspect of the invention, the locking portion may be provided with a first locking portion provided at a first part and a second locking portion provided at a second part, and a fragile part is formed between the first locking portion and the second locking portion. According to the second aspect of the invention, locking portions are respectively provided at the first part and the second part, and lock part of the seat cover well-balancedly. Moreover, by forming the fragile part between the first locking portion and the second locking portion (at a proper part), on one hand the locking member in the second state can lock part of the seat cover well-balancedly and on the other hand can be bent at a proper part.

According to the first aspect of the present invention, it is possible to further improve mounting stability of the locking member. Further, according to the second aspect of the present invention, it is possible to further improve mounting stability of the locking member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
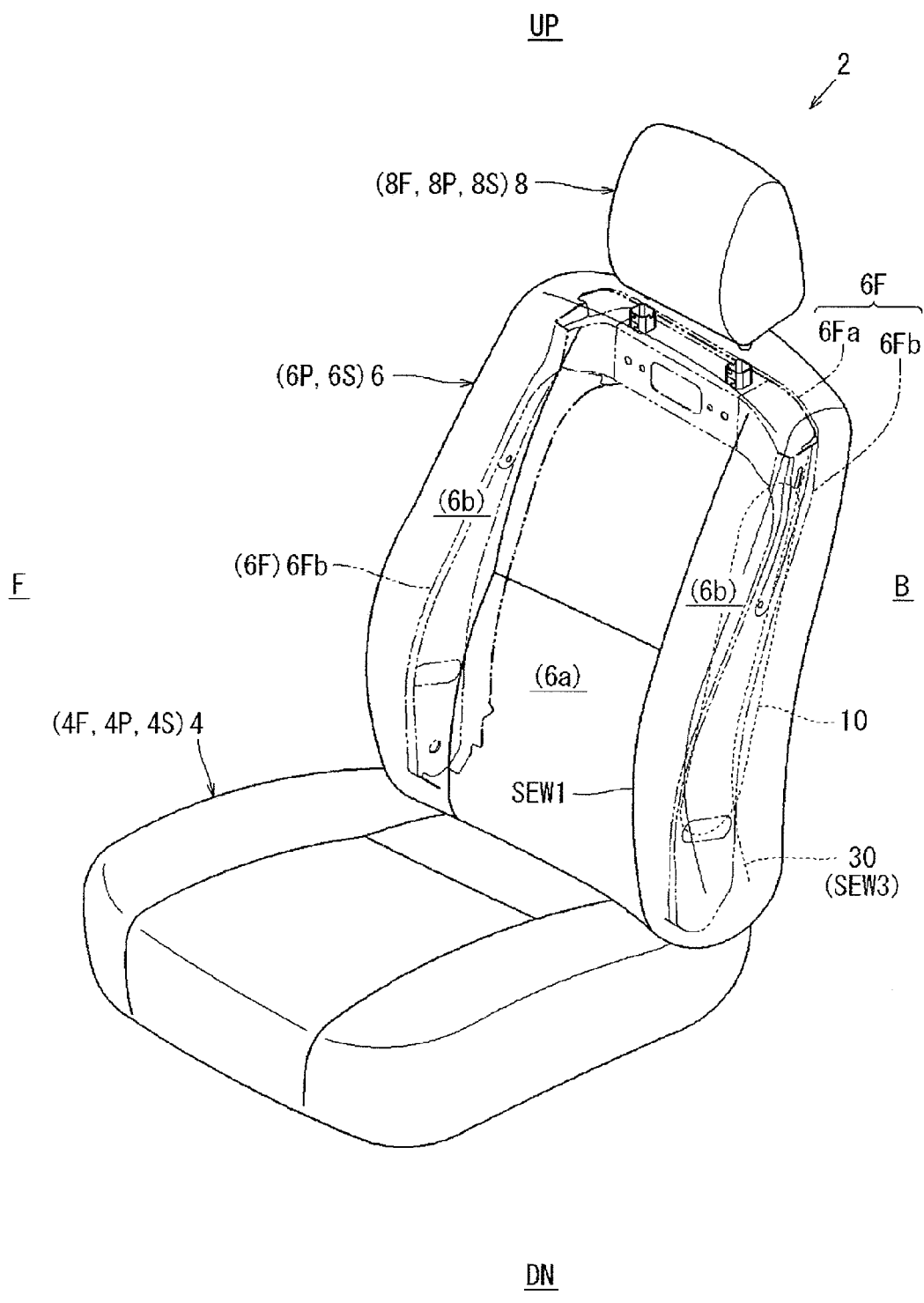
FIG. 1 is a perspective view of the vehicle seat.

Embodiments of the present invention will be described below with reference to FIGS. 1-5. It needs to point out that symbol F appropriately shown in the drawings indicates a frontward direction of the vehicle seat, symbol B indicates a backward direction of the vehicle seat, symbol UP indicates an upward direction of the vehicle seat, and symbol DN indicates a downward direction of the vehicle seat. The vehicle seat 2 in FIG. 1 has a seat pad 4, a seatback 6 and a headrest 8. The above seat members comprising the vehicle seat include respectively a seat frame (4F, 6F, 8F) that forms a seat body, a seat pad (4P, 6P, 8P) that forms a seat appearance, and a seat cover (4S, 6S, 8S) that covers the seat pad. In this embodiment, the seatback 6 is connected with the back of the seat pad 4 in a manner of being capable of standing and falling, and the headrest 8 is provided at the upper portion of the seatback 6 (in a standing state).

The seatback 6 has basic members (6F, 6P, 6S), an airbag 10, other members (a groove portion 20, a fragile portion 30, a tucked cloth 32, and a locking member 34) (see FIGS. 2-4, the members will be described in detail below). In this embodiment, as described below, when the seat cover 6S is used to cover the seat pad 6P, part of the seat cover 6S (the tucked cloth 32) is tucked and locked in the groove portion 20 (the locking member 34) of the seat pad 6P (see FIG. 3). Moreover, because of impact from vehicle collision, the airbag 10 expands toward the outside of the seat from a side of the seatback 6 (the fragile portion 30) to protect side portions of the occupant. In such a structure, it is desirable to prevent part of the seat cover 6S from falling off the locking member 34 in the case of, e.g., the airbag expansion, by further improving mounting stability of the locking member 34. Therefore, in this embodiment, mounting stability of the locking member 34 is further improved using structures described below. Each of the structures will be described below in detail.

The airbag 10 herein (in an unexpanded state) is a substantially cubic member and is disposed in the side portion (a bank portion 6b described below) of the seatback 6 (see FIGS. 1-3). The airbag 10 in this embodiment expands (projects expansibly) toward the outside of the seat under impact from vehicle collision, and thus it is possible to provide protection for a body range from the occupant's breast to the occupant's waist. It needs to point out that the airbag 10 may be a structure in communication with an air supply device (not shown) or a structure configured to enclose a gas generating agent.

The seat frame 6F is an arched frame member, and can be formed using raw materials with an excellent rigidity (e.g., metal or hard resin) (see FIG. 1). Moreover, the seat frame 6F in this embodiment has an upper frame 6Fa that forms an upper body of the seat and a pair of side frames 6Fb that form side bodies of the seat. Further, the pair of side frames 6Fb are respectively flat members (substantially in a U shape as seen in a sectional view), and are disposed opposite to each other at the seat side portions (see FIG. 3). In this embodiment, the airbag 10 in an unexpanded state is fixed to a side portion of one of the side frames 6Fb, and is disposed on a back side of the seat pad 6P (the bank portion 6b described below).

Figure 2:
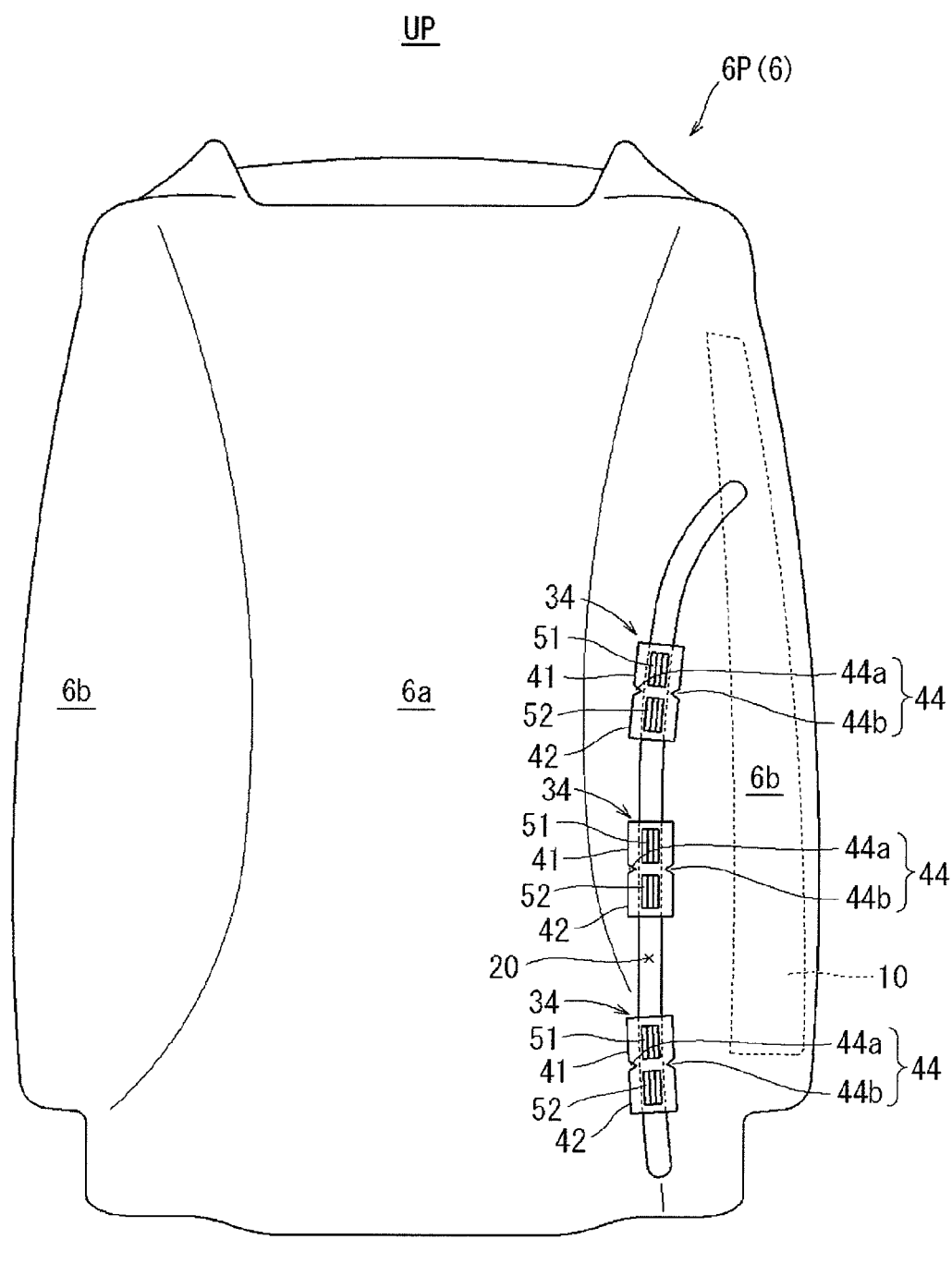
FIG. 2 is a front view of the seat pad.
Figure 3:
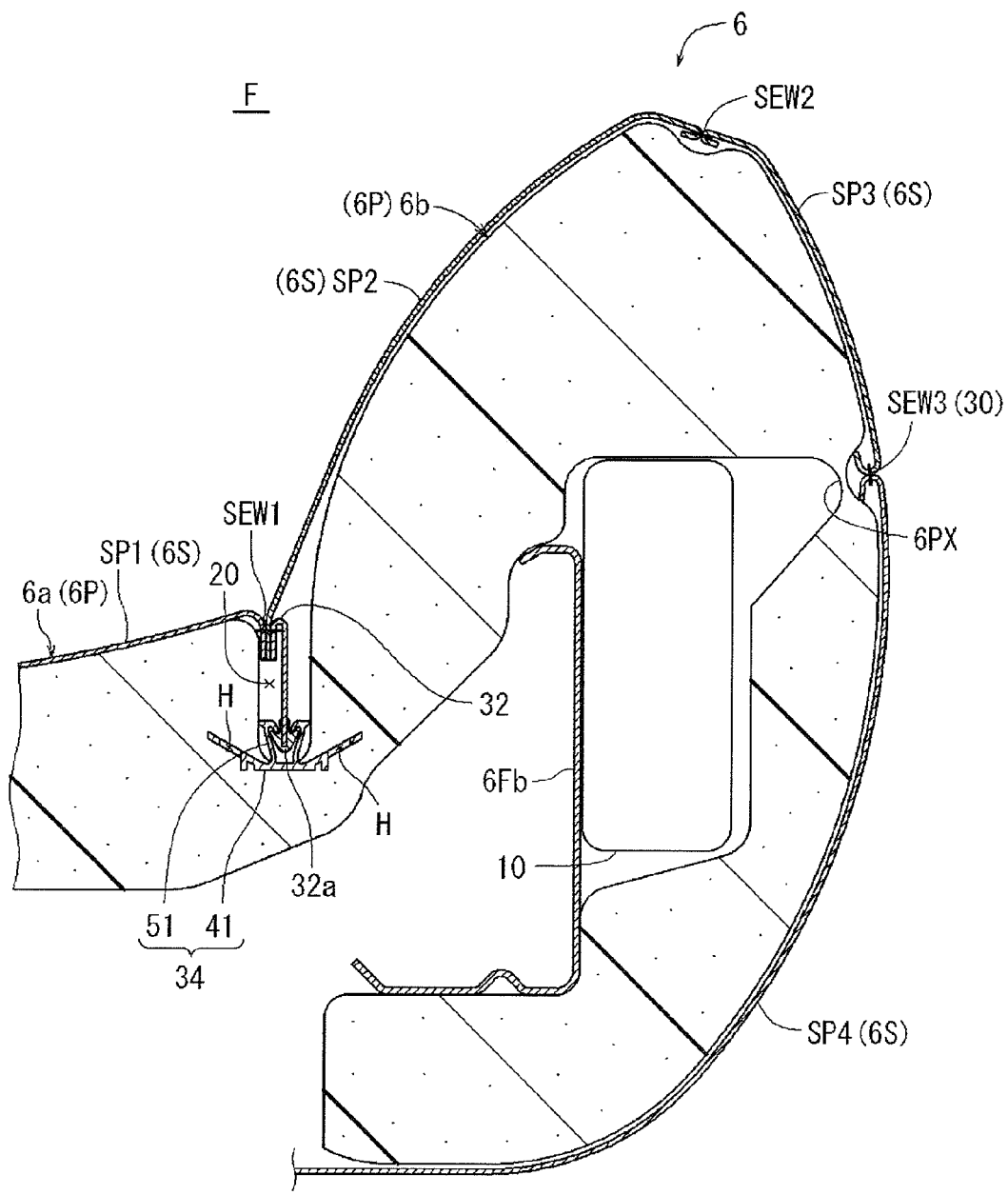
FIG. 3 is a sectional view of part of the seatback.
Figure 4:
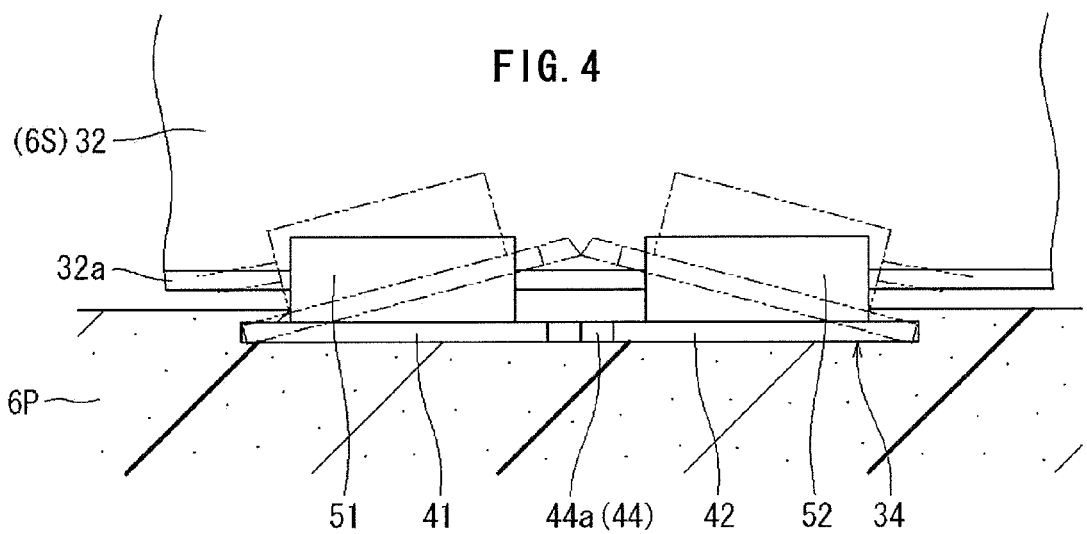
FIG. 4 is a sectional view of part of the seatback from another angle.
Figure 5:
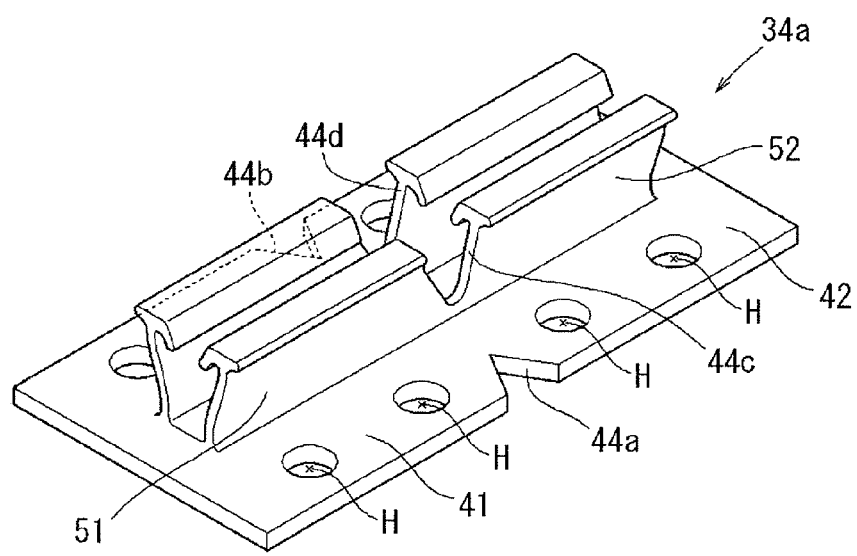
FIG. 5 is a schematic perspective view of a locking member of a variant embodiment.

Besides, the seat pad 6P is a member that can elastically support the occupant, and is made of an elastically retractable resin (see FIGS. 2-4). As this type of resin, a foaming resin, e.g., polyurethane foam (with a density of 10 kg/m$^3$~60 kg/m$^3$), may be exemplified. Moreover, the seat pad 6P of this embodiment is substantially rectangular (as seen in the front view), and has a seated portion 6a, a bank portion 6b, a groove portion 20, and thin wall parts 6PX (see FIGS. 2 and 3). The seated portion 6a is a flat portion at the center of the seat pad 6P, the bank portion 6b is a projecting portion disposed at the side of the seated portion 6a, and can support the sides of the occupant, e.g., when the vehicle is running on a corner, and the groove portion 20 is a recess formed between the seated portion 6a and the bank portion 6b, and into which part of the seat cover 6S described below can be pulled. In this embodiment, the groove portion 20 extends in the seat upward and downward direction with the seatback in a standing state as a reference and is disposed in a position closer to an inner side of the seat than the airbag 10. Moreover, the thin wall parts 6PX are parts that crack more easily than other parts of the seat pad 6P (see FIG. 3). The thin wall parts 6PX in this embodiment are recessed parts (parts whose walls are thinner than other parts of the seat pad) which curve convexly facing the sides of the seat, and are formed opposite to the positions where the fragile portions 30 described below are formed.

In addition, the seat cover 6S is a bag-like member that can cover the seat pad 6P, and has a part of the seat cover from which the airbag 10 expands toward the outside of the seat (the fragile portion 30 described below) and the tucked cloth 32 (see FIG. 3). The seat cover 6S in this embodiment is formed by sewing a plurality of cover pieces (SP1-SP4, etc.) into a bag shape, and sewn parts (SEW1~SEW3, etc.) are formed between adjacent cover pieces. The first cover piece SP1 is a sheet that covers the seated portion 6a, the second cover piece SP2 is a sheet that covers the seated sides (side portions of a top plate) of the bank portion 6b, the third cover piece SP3 is a sheet that covers the seated sides on side faces (a frame portion) of the seat, and the fourth cover piece SP4 is a sheet that covers a rear side of the side faces (the frame portion) of the seat. It needs to point out that as the raw materials of the cover pieces, a cloth (a fabric, a braided fabric, or a non-woven fabric) made of natural fibers or synthetic fibers or leather (natural leather or synthetic leather) can be exemplified. Moreover, in this embodiment, the first cover piece SP1 is sewn onto the second cover piece SP2 at a sewn part SEW1 in a position where the groove portion 20 is formed, the second cover piece SP2 is sewn onto the third cover piece SP3 at a sewn part SEW2 in the vicinity of the top of the bank portion 6b, and the third cover piece SP3 is sewn onto the fourth cover piece SP4 at the sewn part SEW3 in the middle of the side faces (the frame portion) of the seat.

Moreover, the fragile portions 30 are formed at the side faces of the seat cover 6S, and allow the airbag 10 to expand outward (see FIGS. 1 and 3). The fragile portions 30 in this embodiment are the sewn part SEW3 (the part that easily cracks) of the third cover piece SP3 and the fourth cover piece SP4, and extend in the seat upward and downward direction on the sides of the bank portion 6b (the side faces of the seat). Furthermore, as described below, the fragile portions 30 (seams) crack and the airbag 10 expands outward by tension of the seat cover 6S accompanying expansion of the airbag 10.

The tucked cloth 32 is a strip member disposed along the groove portion 20, and is mountable in part of the seat cover 6S (integrated) (see FIGS. 3 and 4). The tucked cloth 32 is typically made of raw materials with an excellent tensile strength (raw materials harder to extend than the seat cover), and the raw materials exemplified in the seat cover 6S can be appropriately selected. For example, in this embodiment, a fabric made of synthetic fibers can be used to form the seat cover 6S, and a non-woven fabric made of the same synthetic fibers (raw materials harder to extend than the fabric) can be used to form the tucked cloth 32. Further, in this embodiment, the tucked cloth 32 is attached on a rear side of the second cover piece SP2. In this state, one end of the tucked cloth 32 is also sewn and mounted in the sewn part SEW1 of the first cover piece SP1 and the second cover piece SP2, and the other end of the tucked cloth 32 (the front end) is attached to a locked portion 32*a* which can be locked by the locking member 34 (in a substantially triangular shape as seen in a sectional view) as described below. It needs to point out that as the locked portion 32*a*, a flat workpiece long in the extension direction of the tucked cloth 32 can be used (see FIG. 4). Moreover, according to the number of the locking members 34 provided, a plurality of locked portions (short flat workpieces) can be attached to proper positions of the tucked cloth 32 and disposed at the corresponding locking members 34 respectively.

The locking member 34 is a flat member that can lock the tucked cloth 32 (part of the seat cover), and can be made of flexible raw materials (typically, resins) (see FIGS. 2-4). The locking member 34 in this embodiment has base portions (41, 42, 44) and a plurality of locking portions (a first locking portion 51 and a second locking portion 52), and is buried and fixed in the seat pad 6P (the groove portion 20). Further, the base portion is a substantially rectangular (seen in a front view) flat portion, and has a first part 41, a second part 42 and a fragile part 44. The first part 41 in this embodiment is a substantially rectangular (seen in a top view) flat part and is long in the extension direction of the groove portion 20. The second part 42 has the same shape and dimension as the first part 41 and is connected with the first part 41 (integrated into one body with the first part 41) in the extension direction of the groove portion 20. The fragile part 44 is more fragile than the first part 41 and the second part 42 and becomes a base point when the locking member 34 is bent (details below). In this embodiment, the fragile part 44 is a base portion that forms a pair of notches 44*a*, 44*b* (substantially in a triangular shape seen in a front view) opposite to each other, and is a thin-wall structure (fragility) more easily bent in the short direction compared with other parts, and further, the fragile part 44 in this embodiment is formed substantially at the center of the locking member 34 (between the first locking portion 51 and the second locking portion 52 described later) viewed in the longitudinal direction.

Besides, the first locking portion 51 is of a substantially U shape (seen in a sectional view), and has a pair of wall bodies (symbols omitted) disposed upright from the first part 41 so that the pair of wall bodies opposite to each other. The first locking portion 51 in this embodiment is slightly shorter than the first portion 41 viewed in the extension direction of the groove portion 20 and is disposed at the center of this first portion 41. Moreover, free end sides of the first locking portion 51 (respective wall bodies) are bent inward, which can lock the end (the locked portion 32*a*) of the tucked cloth 32. The second locking portion 52 is a portion (having the same shape and dimension as the first locking portion 51) disposed upright from the second part 42, and is separated from the first locking portion 51 (at a spacing within which the fragile part can be disposed) and disposed at the center of the second part 42.

In this embodiment, a plurality of locking members 34 are spaced properly and disposed in the groove portion 20 (at the side of the airbag 10) (see FIG. 2). Then the base portion (41, 42, 44) is buried and fixed at the bottom of the groove portion 20, and the first locking portion 51 and the second locking portion 52 are exposed toward the inside of the groove portion 20 and disposed in a position where the locked portion 32*a* can be locked (see FIGS. 3 and 4). There are no special limitations on the methods of fixing the locking member 34 herein, but typically the locking member 34 is buried and fixed by means of insert molding at the same time of formation of the seat pad 6P. In this embodiment, a plurality of through-holes H are formed at edge sides of the base portion (41, 42, 44) at a proper spacing (see FIGS. 3 and 5). Moreover, materials forming the seat pad 6P enter and are cured in the through-holes H, so that the base portion (41, 42, 44) can be more firmly buried and fixed in the seat pad 6P.

With reference to FIGS. 1 and 3, the seat pad 6P is disposed on the seat frame 6F and covered with the seat cover 6S. Then in this embodiment, the fragile portions 30 (SEW3) are disposed at the side faces of the bank portion 6*b*. The sewn part SEW1 of the first cover piece SP1 and the second cover piece SP2 is disposed along the groove portion 20. In this state, the tucked cloth 32 is pulled into the seat and locks the locked portion 32*a* in the locking members 34 (the first locking portion 51 and the second locking portion 52) (see FIGS. 3 and 4). Then the wall bodies of the locking portions 51, 52 opposite to each other return to the original state after being flexed in a direction away from each other under an insertion force of the locked portion 32*a*, so that the locked portion 32*a* can be locked in the locking portions 51, 52. Moreover, in this embodiment, the first part 41 and the second part 42 are respectively provided with locking portions (51, 52), so that the tucked cloth 32 can be tucked and locked in the seat pad 6P well-balancedly. In this way, in this embodiment the locking portions 51, 52 are used to hold the tucked cloth 32 while the base portion (41, 42, 44) is buried and fixed in the seat pad 6P (the locking members 34 are formed into the first state). Accordingly, the sewn part SEW1 is recessed along the groove portion 20 and disposed on the side of the airbag 10.

With reference to FIGS. 1 and 3, the airbag 10 projects from the side faces (the fragile portion 30) of the bank portion 6*b* in the case of, e.g., impact from vehicle collision. Then in this embodiment, the seat cover 6S is pushed by the airbag 10 and is tensioned, and thereby the tucked cloth 32 and the locking member 34 are excessively pulled toward the outside of the seat (see FIGS. 3 and 4). In such a structure, it is desirable to prevent part of the seat cover 6S (the tucked cloth 32) from falling off as much as possible by further improving mounting stability of the locking member 34. Therefore, in this embodiment, the locking member 34 is pulled more strongly toward the outside of the seat than in the first state, and thereby is displaced toward the second state (see the double dash-dotted line state in FIG. 4). Moreover, in the locking member 34 in the second state, the base portion (41, 42, 44) is bent gradually toward a direction away from the seat pad 6P as toward the fragile part 44 from the end of the first part 41 and the end of the second part 42.

Furthermore, in this embodiment, part of the seat cover 6S and the tucked cloth 32 are together pulled strongly (pulled more strongly than in the first state) toward the outside of the seat in the case of the airbag 10 expansion. Thereby, the locking member 34 is displaced to the second state, and thus is bent at the fragile part 44 (bent into a substantially inverted V shape as seen in a side view) to scatter the pull force of the tucked cloth 32, so that the first part 41 and the second part 42 can maintain as much as possible buried in the seat pad 6P at end portion sides away from the fragile part 44. Moreover, in this embodiment, the fragile part 44 is formed between the first locking portion 51 and the second locking portion 52 (at proper parts), so that on one hand the locking member 34 in the second state can lock part (the tucked cloth 32) of the seat cover 6S well-balancedly and on the other hand can be bent at a proper part. Therefore, according to this embodiment, it is possible to further improve mounting stability of the locking member 34.

Besides the above structure, a variety of structures can be adopted as the structure of the locking member herein. For example, in the variant embodiment, the first locking portion 51 and the second locking portion 52 are integratedly disposed and are configured toward the extension direction of the groove portion 20 (see FIGS. 2 and 5). Moreover, at the center of the first locking portion 51 and the second locking portion 52 (the part where the notches 44a, 44b of the fragile part are formed), their free end sides are cut to be fragilized (forming other notches 44c, 44d). Therefore, when the locking member 34a is bent, the first locking portion 51 and the second locking portion 52 can be bent with the base portion (41, 42, 44) with other notches 44a, 44b as a base point (in substantially an inverted V shape as seen in a side view).

The vehicle seat in this embodiment is not intended to be limited to the above embodiment, but other various embodiments can be adopted. For example, in this embodiment, the structure (the shape, dimension, configuration position, configuration number, etc.) of the locking member 34 is exemplified, but it is not intended to limit the structure of the member. For example, in this embodiment, an example of using the notches 44a, 44b to form the fragile part 44 (partially fragilize the base portion) is described, but it is not intended to limit the structure of this part. For example, a groove portion across a base portion can be formed on the base portion in its short direction, or hole portions (through-holes and blind holes) can be formed intermittently thereon, so that the base portion is partially fragilized to form a fragile part. Moreover, it is only required that the base portion is flat, and the base portion can comprises either the first part and the second part (two parts) or more than three parts, and fragile parts are formed between adjacent parts. Locking portions can be formed in at least one of the plurality of parts.

In addition, in this embodiment, an example of forming the first part 41, the second part 42 and the fragile part 44 integratedly is described, but these parts can also be formed separately and then connected using fragile parts. For example, a flat fragile part that is thinner than the above parts can be used to connect the first part and the second part, and a hinged fragile part (a part that can be bent) or a fragile part having rubber elasticity can also be used to connect the first part and the second part. It needs to point out that the hinged fragile part or the fragile part having rubber elasticity is displaceable from the second state to the first state under weakened tension from the tucked cloth 32.

In addition, in this embodiment, the structure of the seat pad 6P is exemplified, but it is not intended to limit the structure (the shape, dimension, etc.) of this member. Moreover, the groove portion of the seat pad can be formed in a proper position of the seat pad (and with a proper orientation). In this embodiment, although the structure of the seat cover 6S is exemplified, it is not intended to limit the structure (the shape, dimension, etc.) of the member. Further, an example of locking part of the seat cover in a locking member via the tucked cloth 32 is described, but part of the seat cover can also be directly provided with a locked portion. A variety of structures (a suspension structure, a clip structure, a shackle structure, etc.) can be adopted for the locked portion as long as part of the seat cover can be attached in the structure of the locked portion. Further, the seat cover, in addition to the case where it is pulled under thrust from the inside of the seat, is also assumed to be pulled from the outside of the seat.

In addition, in this embodiment, the seatback 6 is specially exemplified for depiction. However, the structure of this embodiment is applicable to a variety of structure members of a seat, e.g., a seat cushion. Moreover, the structure of this embodiment can be generally applied to a vehicle seat of, e.g., a car, a plane and a tram.

What is claimed is:

1. A vehicle seat, comprising:
  a seat pad that forms an outer shape of the vehicle seat and supports an occupant elastically;
  a linear groove portion formed on a surface of the seat pad;
  a locking member fixed to the seat pad; and
  a seat cover that covers the seat pad, wherein
  the locking member has a flat base portion buried and fixed in the groove portion and a locking portion disposed in an upright manner from the base portion,
  a part of the seat cover tucked into the groove portion is locked by the locking portion,
  the flat base portion has a flat first part, a flat second part connected with the flat first part in an extension direction of the groove portion, and a first fragile part defined between the flat first part and the flat second part, and
  the locking portion comprises a first locking portion provided at the flat first part, a second locking portion integrally connected with the first locking portion and provided at the flat second part, and a second fragile part defined as a notch provided between the integrally connected first and second locking portions in the extension direction of the groove portion.

2. The vehicle seat according to claim 1, wherein
  the locking member is displaceable between a first state, in which the locking portion is used to hold the part of the seat cover tucked into the groove portion while the base portion is buried and fixed to the seat pad, and a second state, in which the part of the seat cover tucked into the groove portion is pulled more strongly toward the outside of the vehicle seat than in the first state, so that the base portion is bent at the first fragile part toward an opening side of the groove portion.

3. The vehicle seat according to claim 2, wherein
  the second state is a state in which the base portion is bent gradually toward a direction away from the seat pad as toward the first fragile part from an end of the flat first part and an end of the flat second part.

4. The vehicle seat according to claim 1, wherein
  the second fragile part is defined in the base portion.

5. The vehicle seat according to claim 1, wherein
  the first fragile part is a notch defined in the locking portion.

6. The vehicle seat according to claim 5, wherein
  the notch of first fragile part extends in a direction perpendicular to an extending direction of the notch of second fragile part.

7. The vehicle seat according to claim 1, wherein
  the notch of the second fragile part extends in a direction perpendicular to the extension direction of the groove portion.

8. A vehicle seat, comprising:
  a seat pad that forms an outer shape of the vehicle seat and supports an occupant elastically;
  a linear groove portion formed on a surface of the seat pad;
  a locking member fixed to the seat pad; and
  a seat cover that covers the seat pad, wherein the locking member has a flat base portion buried and fixed in the groove portion and a locking portion disposed in an upright manner from the base portion, a part of the seat cover tucked into the groove portion is locked by the locking portion, the flat base portion has a flat first part, a flat second part connected with the flat first part in an extension direction of the groove portion, and a first fragile part defined between the flat first part and the flat second part, the locking member is displaceable between a first state, in which the locking portion is used to hold the part of the seat cover tucked into the groove portion while the base portion is buried and fixed to the seat pad, and a second state, in which the part of the seat cover tucked into the groove portion is pulled more strongly toward the outside of the vehicle seat than in the first state, so that the base portion is bent at the first fragile part toward an opening side of the groove portion, and the second state is a state in which the base portion is bent gradually toward a direction away from the seat pad as toward the first fragile part from an end of the flat first part and an end of the flat second part.

9. The vehicle seat according to claim 8, wherein the locking portion comprises a first locking portion provided at the first part and a second locking portion provided at the second part, and a second fragile part is formed between the first locking portion and the second locking portion.

10. The vehicle seat according to claim 8, wherein the second fragile part is a notch defined in the base portion.

11. The vehicle seat according to claim 8, wherein the first fragile part is a notch defined in the locking portion.

* * * * *